United States Patent
Putnam et al.

(10) Patent No.: US 6,671,118 B2
(45) Date of Patent: Dec. 30, 2003

(54) COMMON MODE TERMINATION METHOD AND APPARATUS FOR A WRITE HEAD

(75) Inventors: John S. Putnam, Excelsior, MN (US); Gary D. Sorenson, Eden Prairie, MN (US)

(73) Assignee: Seagate Technology LLC, Scotts Valley, CA (US)

(*) Notice: Subject to any disclaimer, the term of this patent is extended or adjusted under 35 U.S.C. 154(b) by 301 days.

(21) Appl. No.: 09/833,897

(22) Filed: Apr. 12, 2001

(65) Prior Publication Data

US 2001/0036028 A1 Nov. 1, 2001

Related U.S. Application Data

(60) Provisional application No. 60/198,006, filed on Apr. 18, 2000.

(51) Int. Cl.[7] .............................. G11B 5/02; G11B 5/09
(52) U.S. Cl. ............................................ 360/68; 360/46
(58) Field of Search ............................ 360/68, 67, 46

(56) References Cited

U.S. PATENT DOCUMENTS

| | | | |
|---|---|---|---|
| 4,502,021 A | 2/1985 | Hill et al. | 330/279 |
| 4,939,600 A | 7/1990 | Desai et al. | 360/78.04 |
| 5,552,950 A | 9/1996 | Coffey et al. | 360/128 |
| 5,841,603 A * | 11/1998 | Ramalho et al. | 360/68 |
| 5,883,767 A | 3/1999 | Coffey et al. | 360/128 |
| 5,949,820 A | 9/1999 | Shih et al. | 375/229 |
| 6,111,716 A | 8/2000 | Ngo et al. | 360/67 |
| 6,512,649 B1 * | 1/2003 | Alini et al. | 360/68 |

\* cited by examiner

*Primary Examiner*—Regina N. Holder
(74) *Attorney, Agent, or Firm*—Westman, Champlin & Kelly

(57) ABSTRACT

A disc drive storage system and device is provided in which uncharacteristic behavior of a signal source caused by having to drive a very low impedance due a common mode component of the drive signal is eliminated. A write head that has a first and second end writes on a disc surface. A signal source provides a drive signal to the write head. The drive signal has a differential signal component and a common mode signal component. An electrical interconnect path couples the write head and the signal source. The electrical interconnect path provides a return path for the differential signal component and an open circuit for the common mode signal component. A common mode termination network with a first node, second node and a center tap is included. The first node is connected to the first end of the write head, the second node connected to the second end of the write head and the center tap connected to ground to provide a return path for the common mode signal component. In addition, a method of providing a return path for a common mode signal in a disc drive storage system is provided.

12 Claims, 16 Drawing Sheets

COMMON MODE TERMINATION METHOD AND APPARATUS FOR A WRITE HEAD

CROSS-REFERENCE TO RELATED APPLICATION

This application claims priority to U.S. Provisional Application No. 60/198,006, filed Apr. 18, 2000, and entitled "COMMON MODE TERMINATION FOR THE WRITE HEAD".

FIELD OF THE INVENTION

The present invention relates to data storage systems and, in particular, to providing common mode termination for a write head.

BACKGROUND OF THE INVENTION

In disc drives and other data storage systems, digital data is written to and read from data storage surface. Read and write operations are performed through a transducer which is typically carried on a slider body. The slider and the transducer are sometimes collectively referred to as a head, and typically, a single head is associated with each data storage surface. Data are stored by magnetizing the disc storage surface in one of two possible orientations to indicate either a logic 0 or a logic 1. This is referred to as a "write" operation. When writing data, the head carries a current which creates a magnetizing force large enough to saturate the magnetic medium. A write current source with a current return path forms a write circuit that provides write current to the head.

Ideally, the write current source should provide a purely differential write signal to the load (head). However, the circuit topology, manufacturing process and circuit parasitics introduce aberrations in elements of the write circuit. Consequently, in addition to the differential signal provided to the load, an undesirable common mode signal is also present in the write circuit. In current non center tapped heads used in disc drives, the common mode signal does not have a return path. Absence of a return path results in the impedance seen by the common mode portion of the write driver (write current source and current path) to behave like an open circuit stub. Open circuit stubs behave like tuned circuits with series and parallel resonance occurring at ¼ wavelength and ½ wavelength respectively. In a typical flex circuit used in disc drive products, series resonance occurs approximately 500 MHz with an impedance magnitude of approximately 1 ohm which is essentially a short circuit. It is this low impedance value of the series resonance portion of the common mode impedance that can adversely effect active components of the write circuit. If the signal bandwidth of the common mode portion of the write circuit includes, or goes beyond, the series resonance of the common mode impedance loading the write amplifier, uncharacterized write amplifier performance will result because of its inability to drive exceptionally low common mode impedances.

Design constraints make it difficult to use a write amplifier having minimal or zero common mode output, or a write amplifier capable of driving very low values of impedance.

The present invention addresses these problems, and offers other advantages over the prior art.

SUMMARY OF THE INVENTION

The present invention relates to data storage systems that include common mode termination for a write head which solves the above-mentioned problem.

A disc drive storage system and device is provided in which uncharacterized behavior of a signal source caused by having to drive a very low impedance due a common mode component of the drive signal is eliminated. A write head that has a first and second end writes on a disc surface. A signal source provides a drive signal to the write head. The drive signal has a differential signal component and a common mode signal component. An electrical interconnect path couples the write head and the signal source. The electrical interconnect path provides a return path for the differential signal component and an open circuit for the common mode signal component. A common mode termination network with a first node, second node and a center tap is included. The first node is connected to the first end of the write head, the second node connected to the second end of the write head and the center tap connected to ground to provide a return path for the common mode signal component. In addition, a method of providing a return path for a common mode signal in a disc drive storage system is provided.

These and various other features as well as advantages which characterize the present invention will be apparent upon reading of the following detailed description and review of the associated drawings.

BRIEF DESCRIPTION OF THE DRAWINGS

FIG. 2-1 is a simplified block diagram of a prior art write circuit.

FIG. 2-2 is a schematic circuit diagram showing details of the prior art write circuit of FIG. 2-1.

FIG. 2-3 is a schematic circuit diagram of the prior art write circuit which includes details of the write amplifier.

FIG. 2-4 is a schematic circuit diagram that represents details of the differential source portion of the prior art write circuit of FIG. 2-3.

FIG. 2-5 is a schematic circuit diagram that represents details of the common mode portion of the prior art write circuit of FIG. 2-3.

FIG. 3-1 is schematic circuit diagram of the prior art write circuit with impedance measured looking through the flex circuit interconnect path.

FIG. 3-2 shows impedance plots corresponding to common mode impedance measurements looking through the flex circuit interconnect path of the prior art write circuit shown in FIG. 3-1.

FIG. 3-3 is a Smith Chart plot of the common mode impedance measurements looking through the flex circuit interconnect path of the prior art write circuit shown in FIG. 3-1.

FIG. 4-1 is schematic circuit diagram of the prior art write circuit with impedance measured looking through a tester included with the flex circuit interconnect path.

FIG. 4-2 shows impedance plots corresponding to common mode impedance measurements looking through a tester included with the flex circuit interconnect path of the prior art write circuit shown in FIG. 4-1.

FIG. 4-3 is a Smith Chart plot of the common mode impedance measurements looking through a tester included with the flex circuit interconnect path of the prior art write circuit shown in FIG. 4-1.

FIG. 5-1 is schematic circuit diagram of the prior art write circuit with impedance measured looking through the flex circuit interconnect path with the flex circuit connected to ground.

FIG. 5-2 shows impedance plots corresponding to common mode impedance measurements looking through the flex circuit interconnect path with the flex circuit connected to ground shown in FIG. 5-1

FIG. 6-1 is a schematic circuit diagram illustrating a center tapped write circuit in accordance with the present invention.

FIG. 6-2 is a schematic circuit diagram illustrating a center tapped write circuit which includes a particular embodiment of a common mode termination network.

FIG. 6-3 is a top view of a load beam portion of the head-gimbal assembly showing a flex circuit interconnect path with a common mode termination network in accordance with an embodiment of the present invention.

FIG. 7-1 is schematic circuit diagram of the center tapped write circuit with impedance measured looking through the flex circuit interconnect path with the flex circuit connected to ground.

FIG. 7-2 shows impedance plots corresponding to common mode impedance measurements looking through the flex circuit interconnect path with the flex circuit connected to ground shown in FIG. 7-1.

DETAILED DESCRIPTION OF ILLUSTRATIVE EMBODIMENTS

Figure 1:
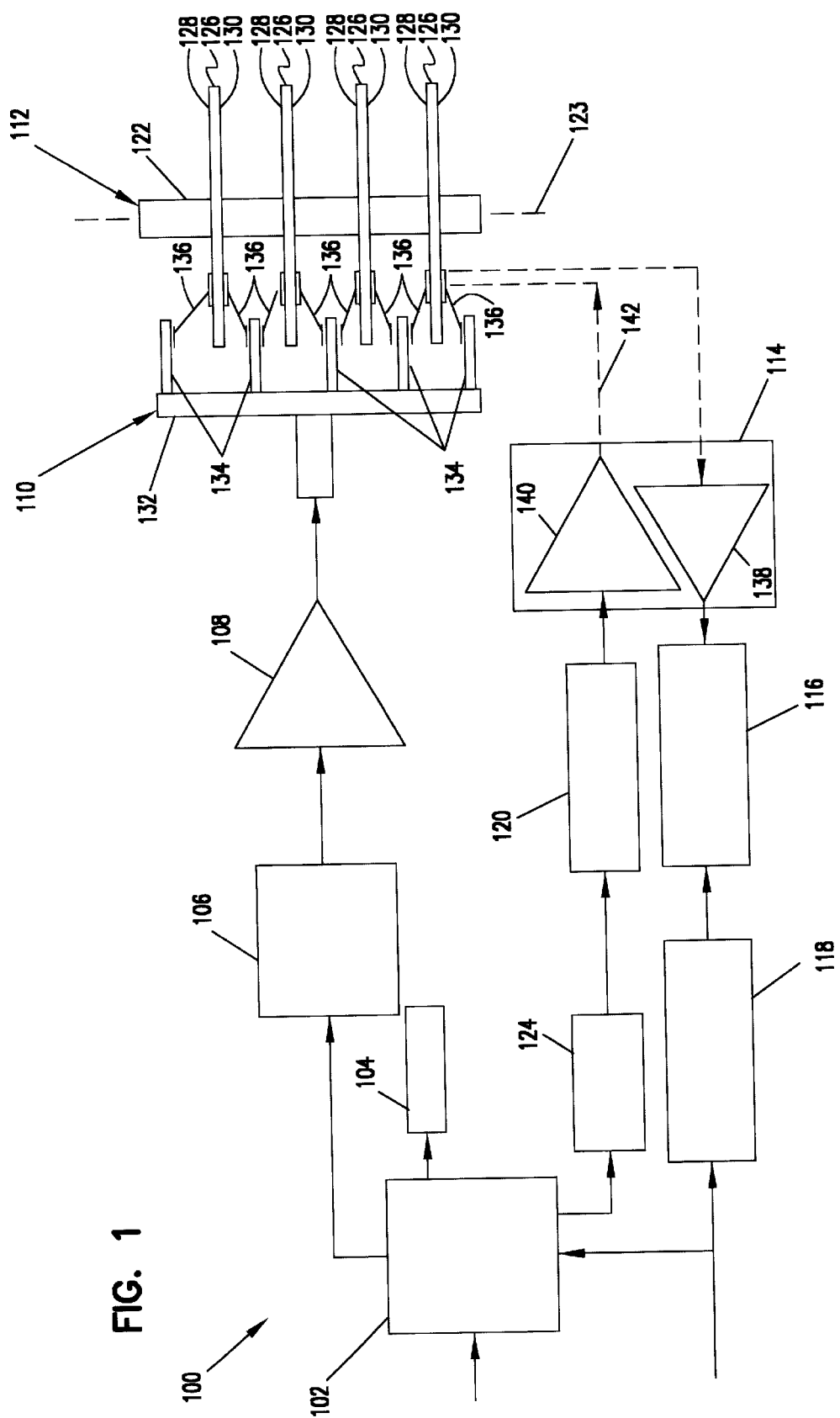
FIG. 1 is a block diagram of a disc drive with which the present invention is useful.

Referring now to FIG. 1, a block diagram of disc drive 100 with which the present invention is useful is shown. The same reference numerals are used in the various figures to represent the same or similar elements. Disc drive 100 includes drive controller 102, memory 104, servo control processor 106, power amplifier 108, actuator assembly 110, disc stack assembly 112, read/write interface 114, data and clock recovery circuit 116, error detection circuit 118, write precompensation circuit 120 and encoder 124.

Drive controller 102 is typically a microprocessor, or digital computer, and is coupled to a host system, or another drive controller which controls a plurality of drives. Drive controller 102 operates based on programmed instructions stored in memory 104 and received from the host system.

Disc stack assembly 112 includes spindle 122 which supports a is plurality of coaxially arranged discs 126. Discs 126 are mounted for rotation with spindle 122 about an axis of rotation 123. Each of the discs 126 has a first surface 128 and a second surface 130. Surfaces 128 and 130 include concentric tracks for receiving and storing data in the form of magnetic flux reversals encoded on the tracks. A group of tracks includes one track per surface 128 and 130, and is referred to as a cylinder. Each track in the group is located at a common radial distance from the inner diameter of the corresponding disc 126 upon which it resides.

Actuator assembly 110 includes an actuator 132 supporting a plurality of actuator arms 134. Each of the actuator arms 134 is rigidly coupled to at least one head-gimbal assembly 136. Each head-gimbal assembly includes a load beam, or flexure arm, rigidly coupled to actuator arm 134 at a first end thereof, and to a gimbal at a second end thereof. The gimbal is, in turn, coupled to a hydrodynamic bearing, such as an air bearing, which supports a transducer head above the corresponding disc surface 128, 130, for accessing data within the tracks on the disc surface.

Actuator 132 is rotatably mounted with respect to discs 126. As an actuator 132 rotates, it moves the transducer heads coupled to the head-gimbal assemblies 136 either radially inward, toward an inner radius of the corresponding disc 126, or radially outward, toward an outer radius of the corresponding disc 126. In this way, actuator 132 positions the transducer heads on head-gimbal assemblies 136 over a desired track (and cylinder) on the discs 126.

In operation, drive controller 102 typically receives a command signal from the host system which indicates that a certain portion of a disc 126 on disc stack assembly 112 is to be accessed. In response to the command signal, drive controller 102 provides servo control processor 106 with a position signal which indicates a particular cylinder over which actuator 132 is to position head-gimbal assemblies 136. Servo control processor 106 converts the position signal into an analog signal which is amplified by power amplifier 108 and provided to actuator assemblies 110. In response to the analog position signal, actuator 132 positions head-gimbal assemblies 136 over the desired cylinder.

The command signal from the drive controller 102 also indicates the particular sector to be read from or written to. If the particularly identified disc and sector are to be read, the data head on the corresponding head-gimbal assembly 136 generates a read signal in response to the stored magnetic flux reversals. The data head provides the read signal to read/write interface 114. Read/write interface 114 includes a preamplifier 138 which amplifies the read signal and provides it to data and clock recovery circuit 116. Data and clock recovery circuit 116 recovers the data which is encoded on the disc surface when the data is written to the disc surface. Data and clock recovery circuit 116 operates in a known manner. Once the data is recovered, it is provided to error detection circuit 118 which detects whether any errors have occurred in the data read back from the disc.

During a write operation, the host system provides drive controller 102 with a command signal which indicates the amount of data to be stored and the particular data tracks and sectors at which the data is to be stored. The host system also transfers the data to be stored to a buffer in memory 104 so the data can be accessed by drive controller 102. Drive controller 102 provides the data to encoder 124. Encoder 124 encodes the data into a serial train of write pulses representing magnetic flux reversals to be written on the disc surfaces 128 and 130. Encoder 124 operates in a known manner.

Write precompensation circuit 120 modifies the serial train of write pulses by performing an operation known as a non-linear or pattern independent transition shift. Write precompensation circuit 120 shifts the relative position of the write pulses to properly space the flux reversals on the disc surfaces 128 and 130. Write precompensation circuit 120 also operates in a known manner.

The write pulses are then passed to a write amplifier circuit 140 within read/write interface 114 which directs current through electronic interconnect path 142 and the transducer head (not shown) in one of two directions as a function of the write pulses.

Figures 1, 2:
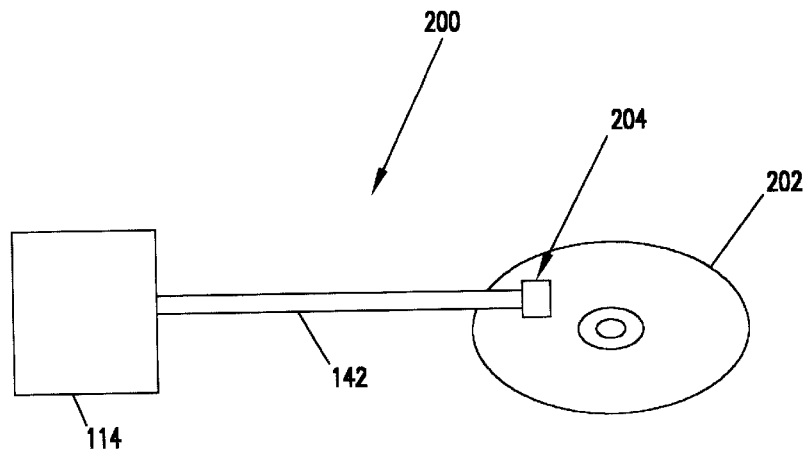
Figure 2:
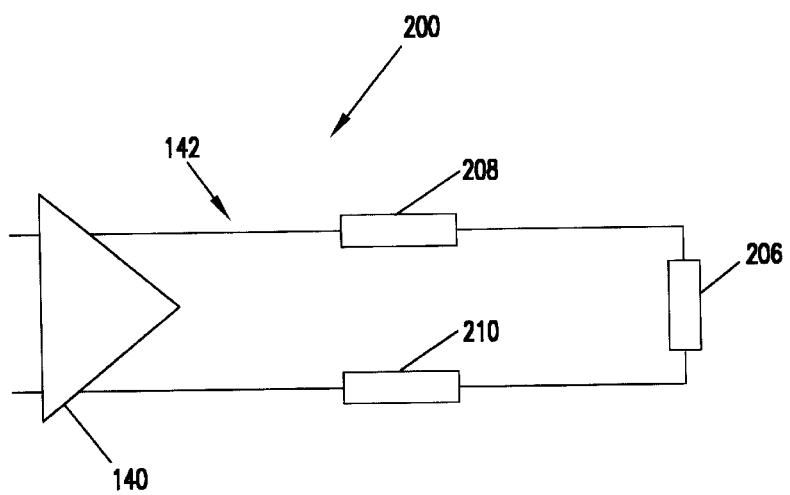

Referring now to FIG. 2-1, a simplified block diagram of a prior art write circuit 200 is shown. For ease of illustration, only one disc 202 of multiple discs 126 (of FIG. 1) is shown. Prior art write circuit 200 includes signal source or read/write interface 114. Also included are electrical interconnect path 142 and write head 204 that writes on a surface of disc 202. Electronic interconnect path 142 provides an electrical transmission medium for a drive waveform from signal source 114 to write head 204.

Referring now to FIG. 2-2, details of prior art write circuit 200 of FIG. 2-1 are shown. A write amplifier 140 provides an input signal that drives head impedance 206. Also included is interconnect path 142 with associated interconnect path impedances 208 and 210. Behavior of write amplifier 140 can be explained by breaking it up in to components shown in FIG. 2-3. Signal generators 212 and 214 with associated resistors 216 and 218 represent elements supplying a differential input component of the input signal driving head impedance 206 via interconnect path 142. The presence of a common mode signal component in the input signal provided by prior art write circuit 200 is represented by signal generator 220 with associated resistor 222 also driving head impedance 206. FIGS. 2-4 and 2-5 separate write circuit 200 into a purely differential write circuit 230 (FIG. 2-4) which has a bi-directional current path 232 and a common mode circuit 240 (FIG. 2-5) with no return path for current represented by open circuit 242. Accordingly, common mode signal generator 220 produces a common mode signal component that does not have a return path in common mode circuit 240. The impedance seen by common mode write driver behaves like an open circuit stub which is a short circuit when series resonance occurs and can adversely effect active elements of the write circuit. If the signal bandwidth of common mode write circuit 240 includes, or goes beyond, the series resonance of the common mode impedance loading write amplifier 140, uncharacterized write amplifier performance will result because of its inability to drive exceptionally low impedances from its common mode voltage source 220. The differential signal bandwidth of a writer is greater than 500 Mhz using first order approximation bandwidth =0.5/rise time.

Figures 2, 3:
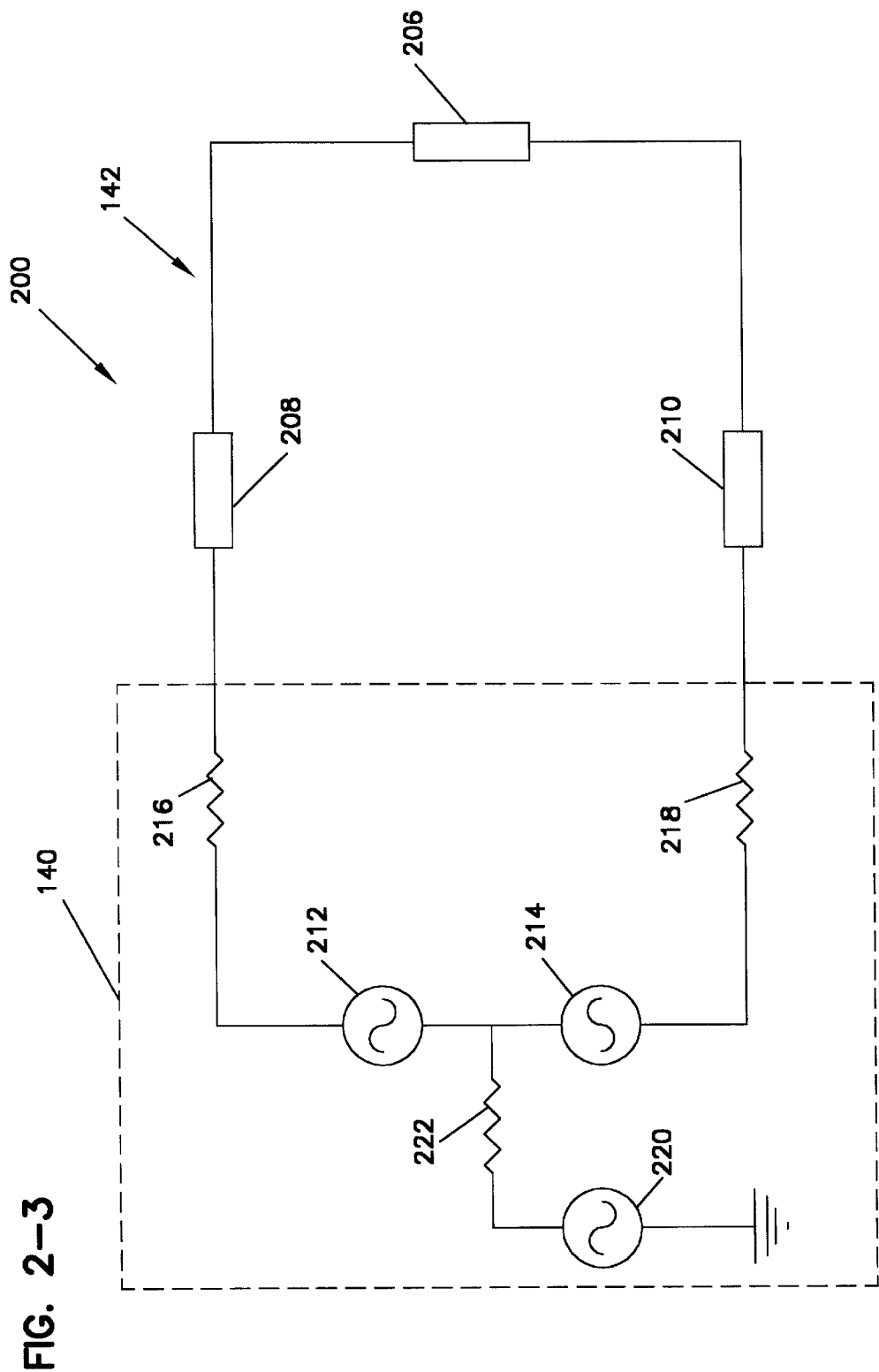

Referring now to FIG. 3-1, prior art write circuit 200 with impedance 301 measured looking through flex circuit interconnect path 142 is shown. The flex circuit is represented by blocks 302 and 304. The common mode impedance loading write amplifier 140 is measured using impedance analyzers or an s-parameter analyzer. Measurements with superior correlation have been obtained by using a differential network analyzer.

Referring now to FIG. 3-2, impedance plots corresponding to common mode impedance measurements looking through flex circuit interconnect path 142 are shown. Magnitude impedance plot 326 shows the variation of the magnitude of impedance in ohms along axis 324 as a function of frequency along axis 322 in units of 10 MHz. Series resonance point 332 is at a frequency of 673 MHz with a corresponding common mode impedance of less than 5 ohms which is low enough to significantly impair write amplifier performance. In contrast, the common mode impedance is very large at parallel resonance point 330 and occurs at a frequency of 971 MHz. High impedance at parallel resonance does not adversely effect active elements of write circuit 200. Phase impedance plot 328 shows the variation of the phase of impedance in degrees along axis 324 as a function of frequency along axis 322. The phase angle at series resonance point 332 and parallel resonance point 330 is 0 degrees indicating that the impedance at these two points is purely resistive. At all other frequencies the resulting impedance looking into the flex circuit includes inductive or capacitive reactances. FIG. 3-3 is a Smith Chart plot 333 representing combined magnitude and phase for impedance measurements according to FIG. 3-1. Series resonance point 332 (of FIG. 3-2) corresponds to point 334 on Smith Chart plot 333 and Parallel resonance point 330 (of FIG. 3-2) corresponds to point 335 on Smith Chart plot 333. The series resonant frequency (673 MHz) and parallel resonant frequency (971 MHz) are shown on the Smith Chart.

Figures 2, 3, 4:
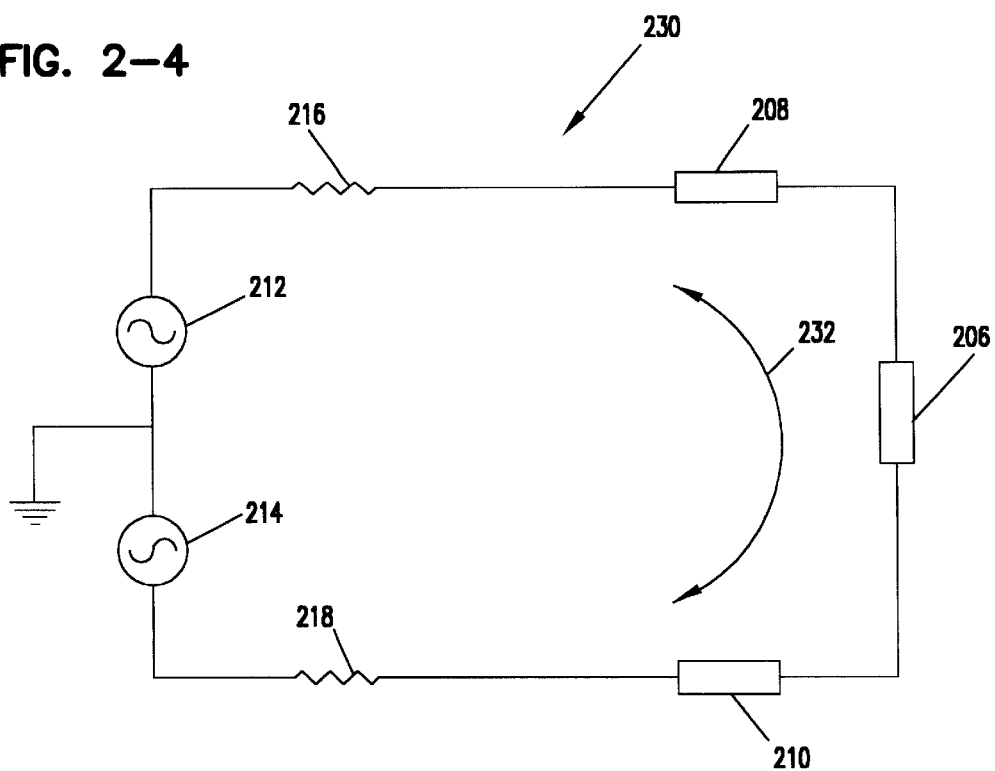

Referring now to FIG. 4-1, prior art write circuit 200 with impedance 401 measured looking through a tester (represented by blocks 402 and 403) and flex circuit interconnect path 142 is shown. The common mode impedance loading write amplifier 140, as in FIG. 3-1, is measured using impedance analyzers or an s-parameter analyzer.

Referring now to FIG. 4-2, impedance plots corresponding to impedance measurements performed at the position (impedance 401) illustrated in FIG. 4-1 are shown. Magnitude impedance plot 426 shows the variation of the magnitude of impedance in ohms along axis 424 as a function of frequency along axis 422 in units of 10 MHz. Series resonance is represented by series resonance point 430 at a frequency of 320 MHz with a corresponding common mode impedance of 3 ohms. The inclusion of the tester has caused series resonance to occur at 320 MHz as compared to 673 MHz without the tester (FIG. 3-1), thereby making tester applications more vulnerable to performance impairment due to common mode behavior of the write circuit. Consequently, different behavior of components under investigation could result when the same components are placed in another evaluation using different hardware because of large differences in common mode impedance that can exist and then effect write amplifier behavior. Phase impedance plot 428 shows the variation of the phase of impedance in degrees along axis 424 as a function of frequency along axis 322. The phase angle at series resonance point 332 is 0 degrees indicating that the impedance is purely resistive. FIG. 4-3 is a Smith Chart plot 443 representing a combination of phase and magnitude plots of FIG. 4-2. Series resonance point 430 corresponds to point 444 on Smith Chart plot 443.

Figures 2, 3, 4, 5:
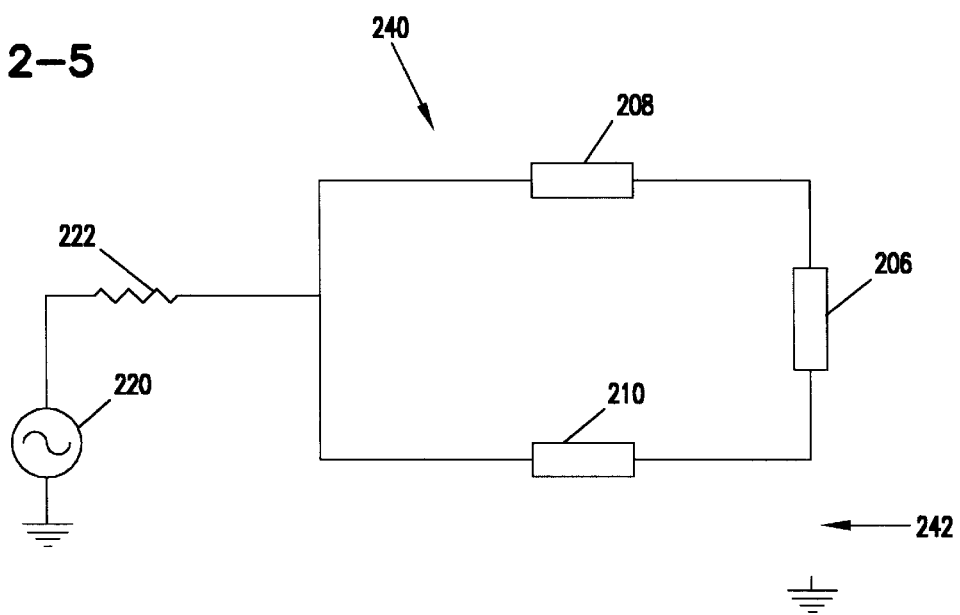
Figures 1, 3:
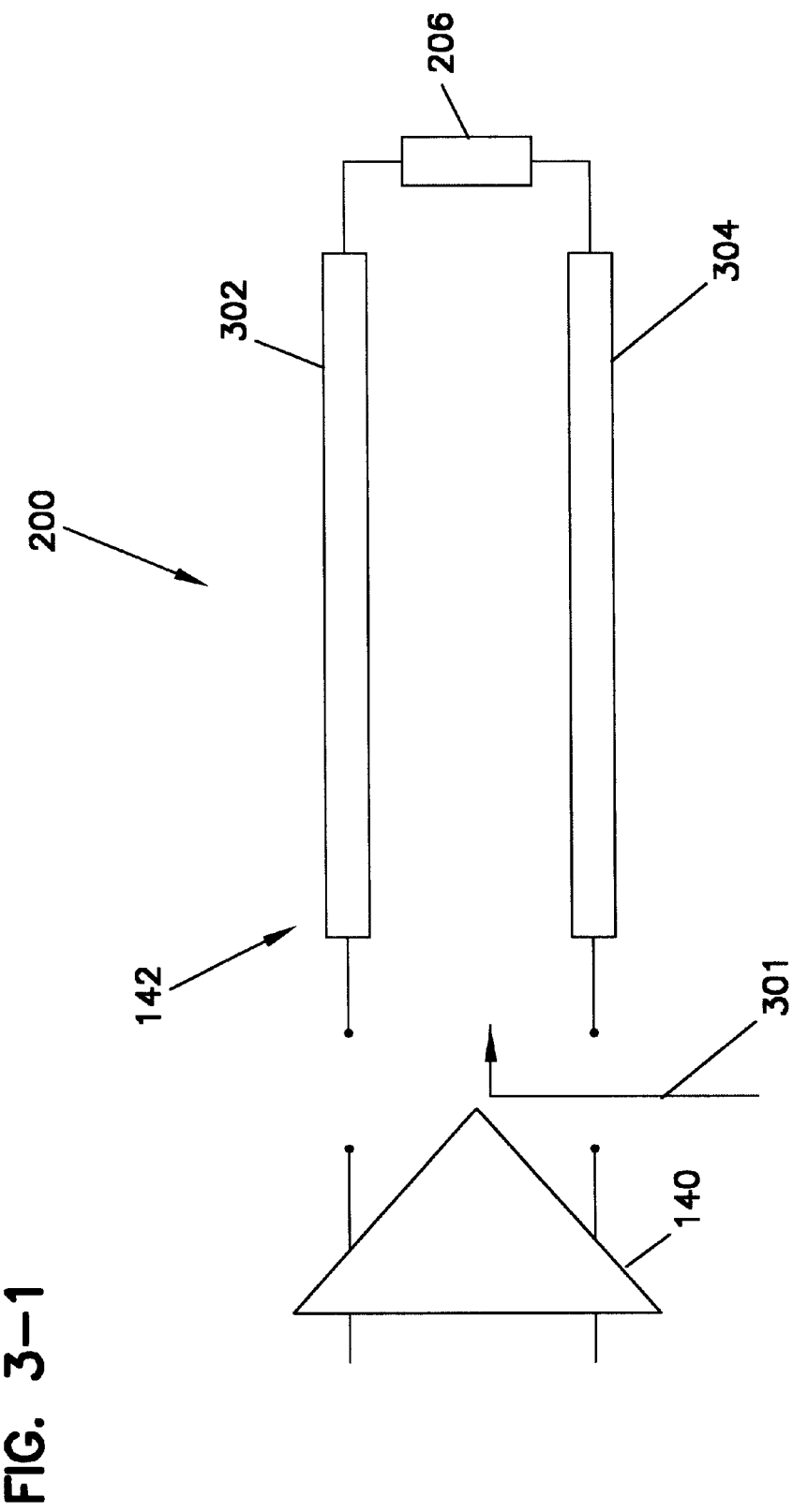
Figures 2, 3:
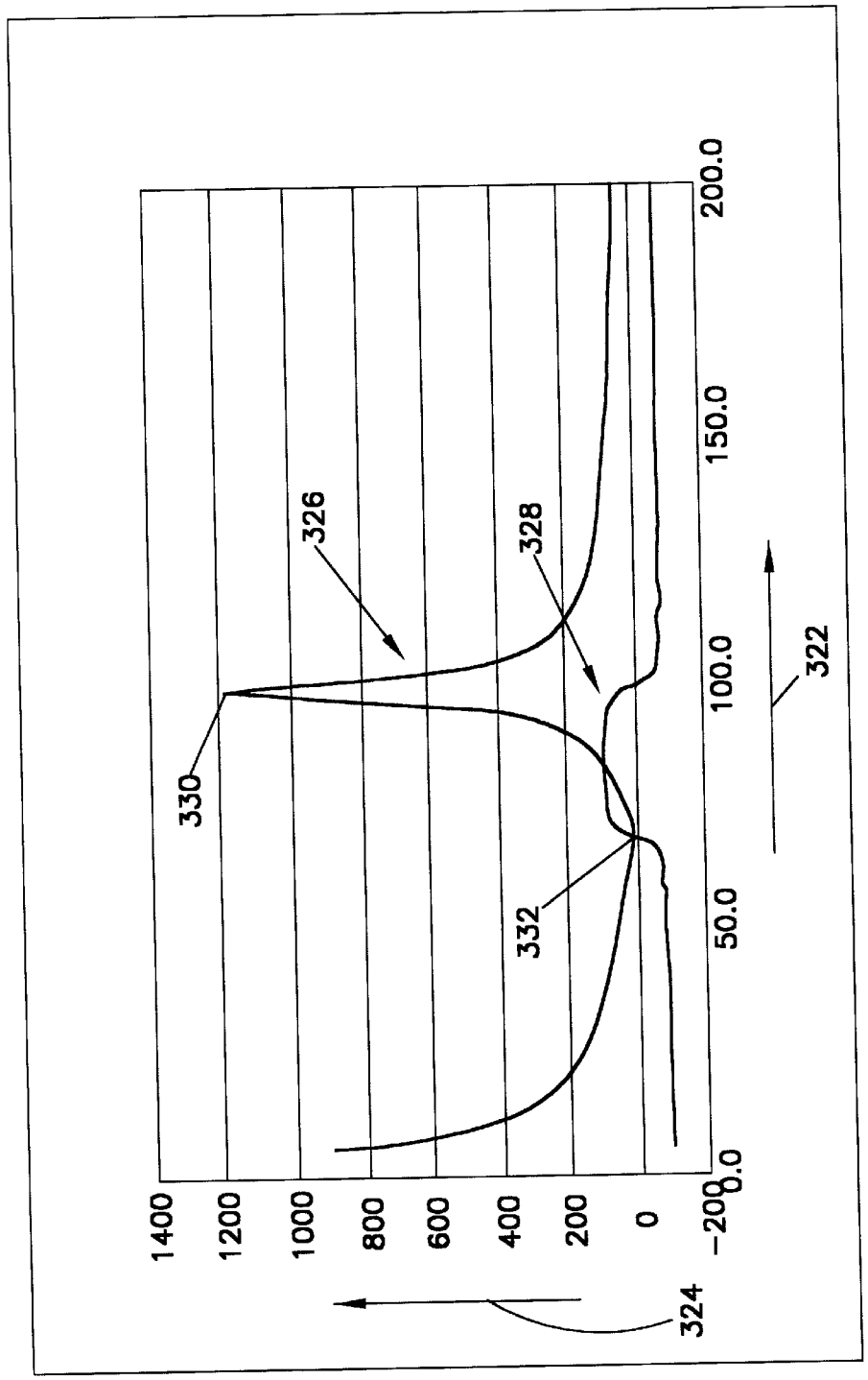
Figure 3:
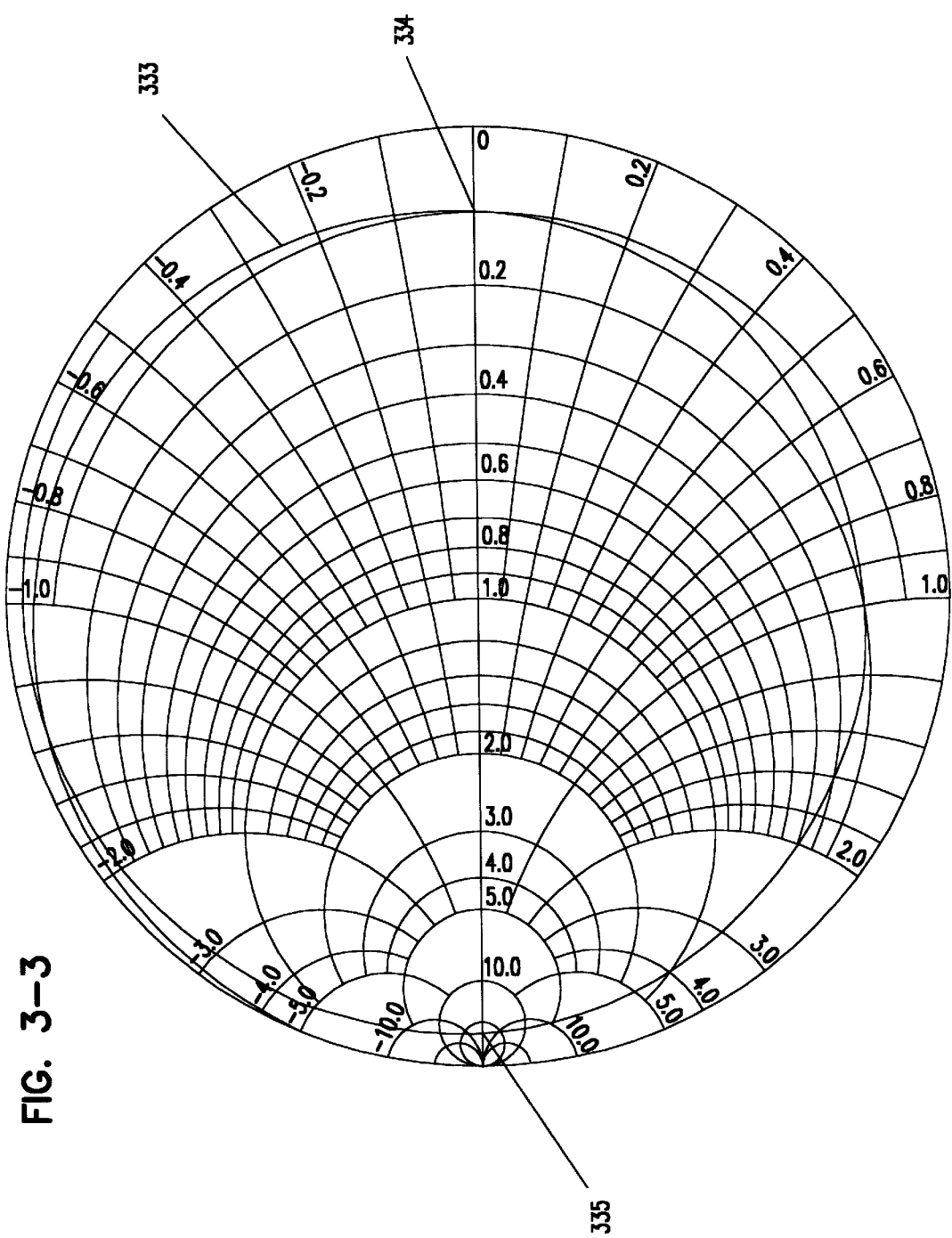
Figures 1, 4:
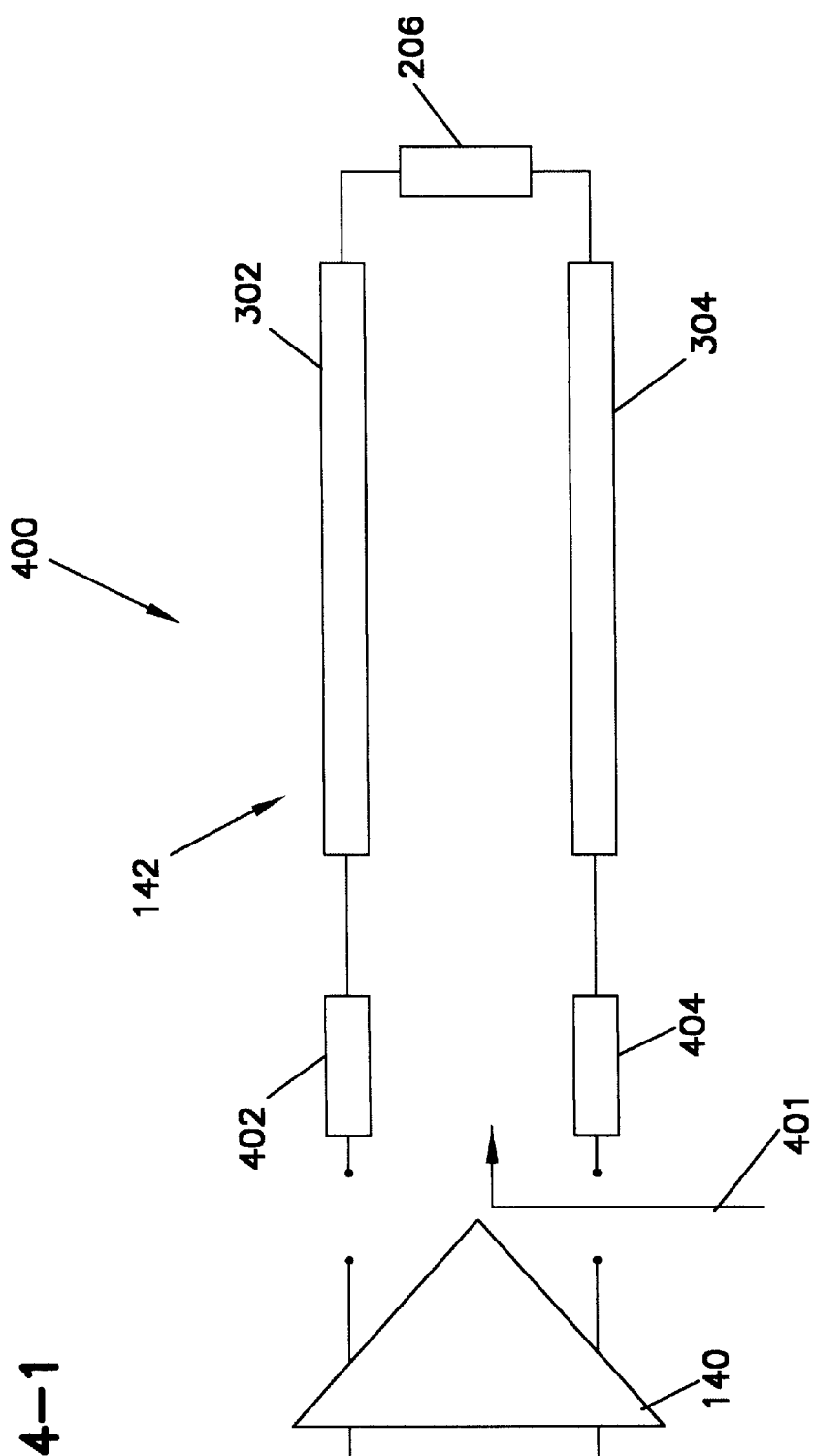
Figures 2, 4:
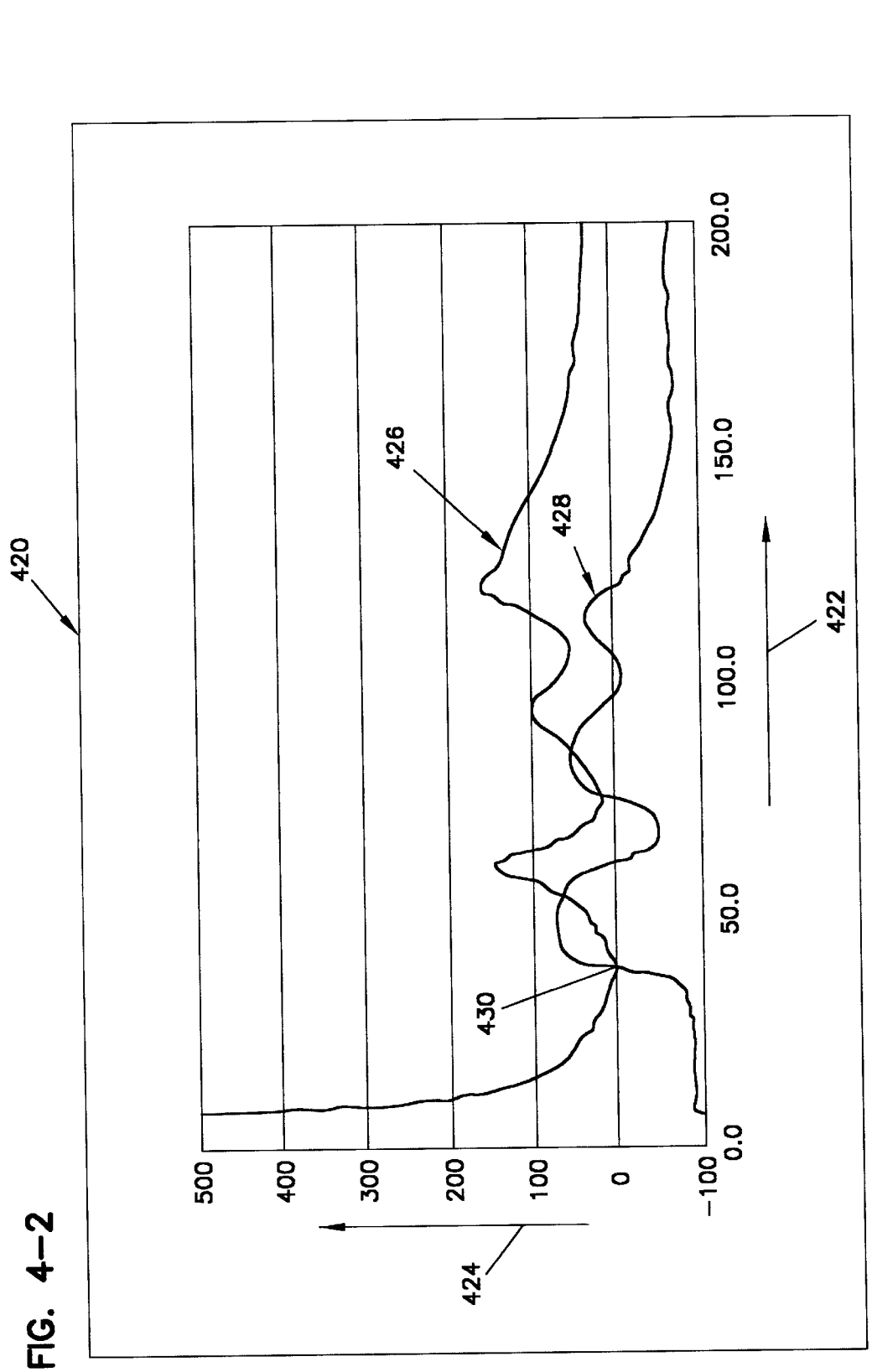
Figures 3, 4:
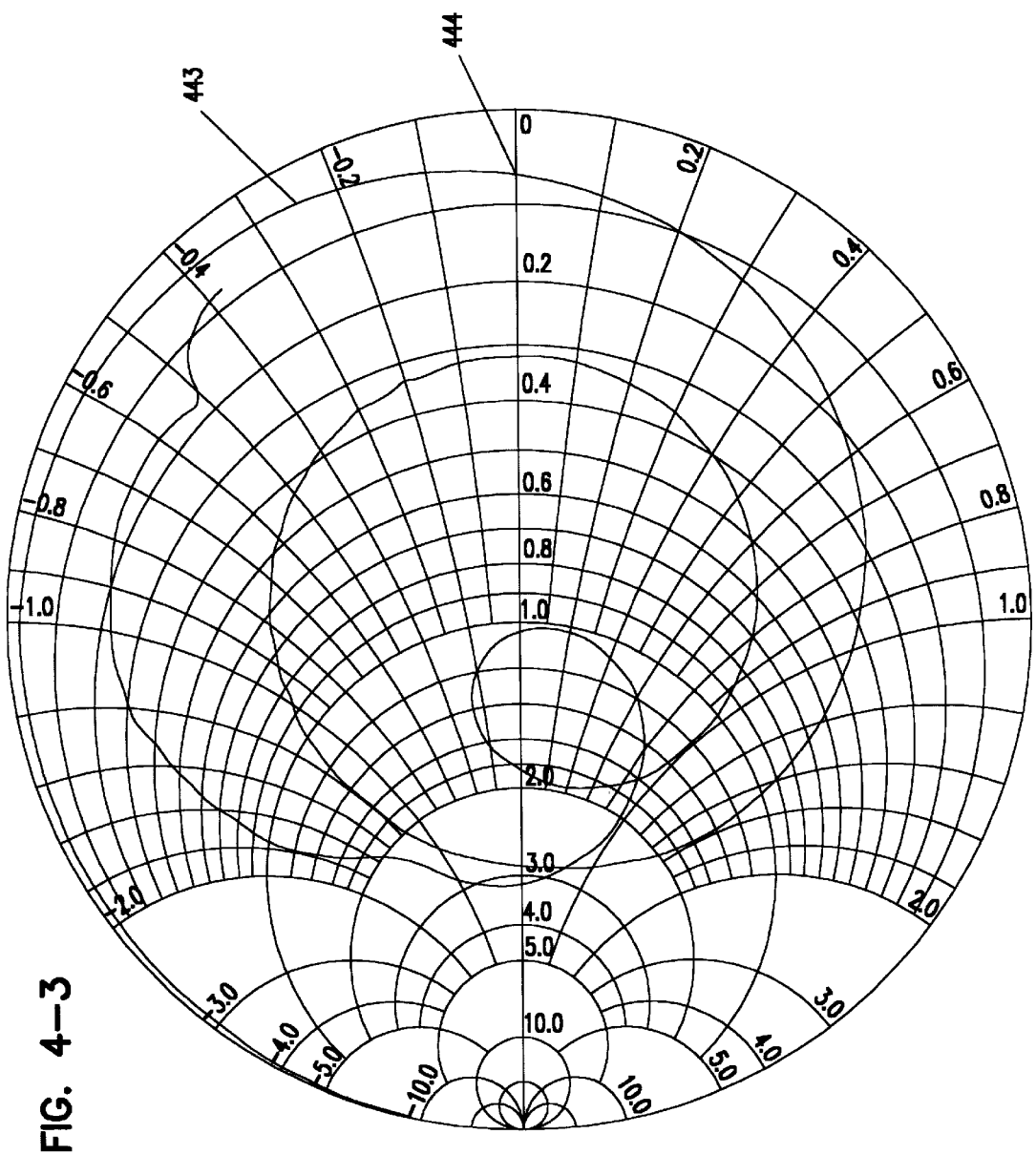
Figures 1, 5:
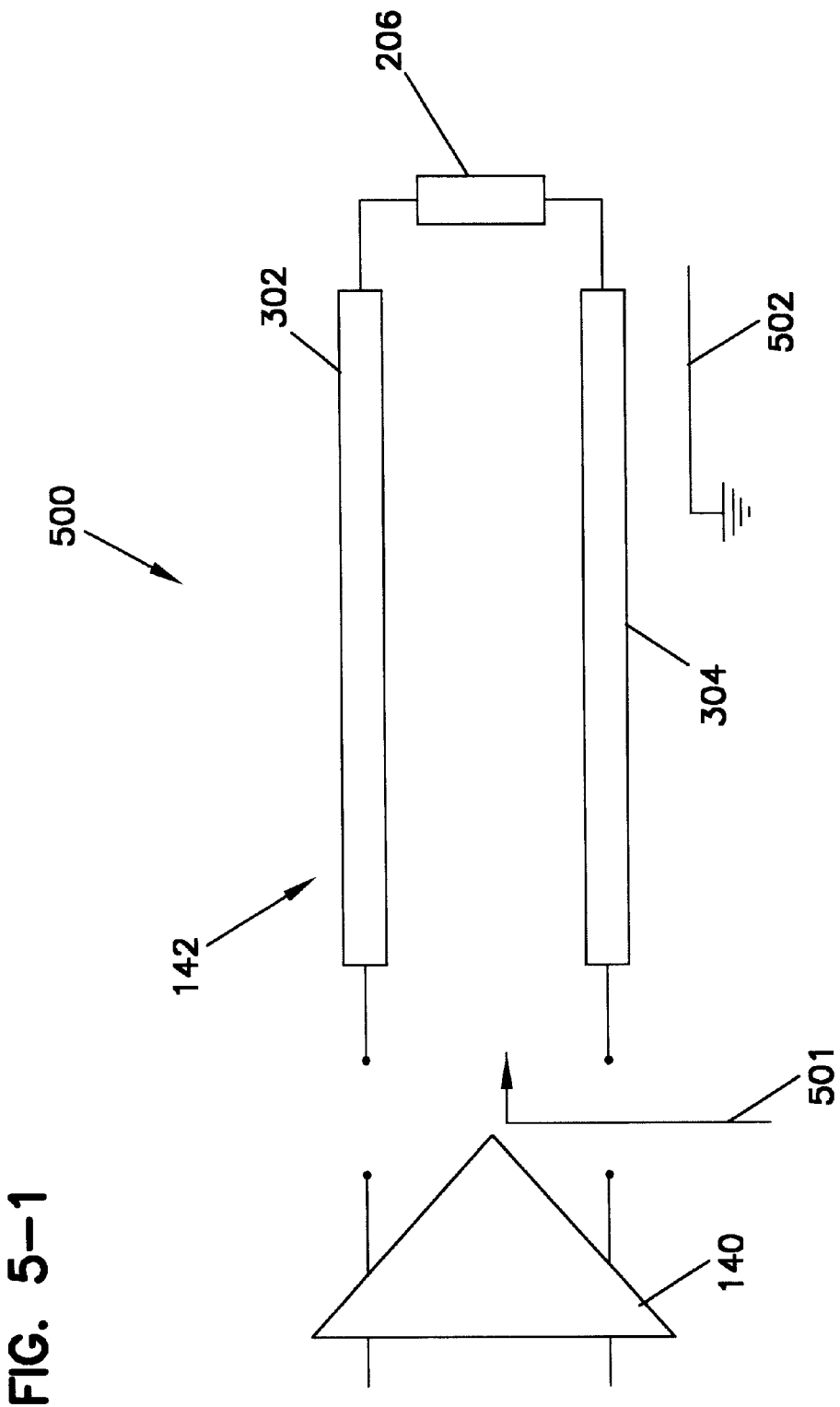
Figures 2, 5:
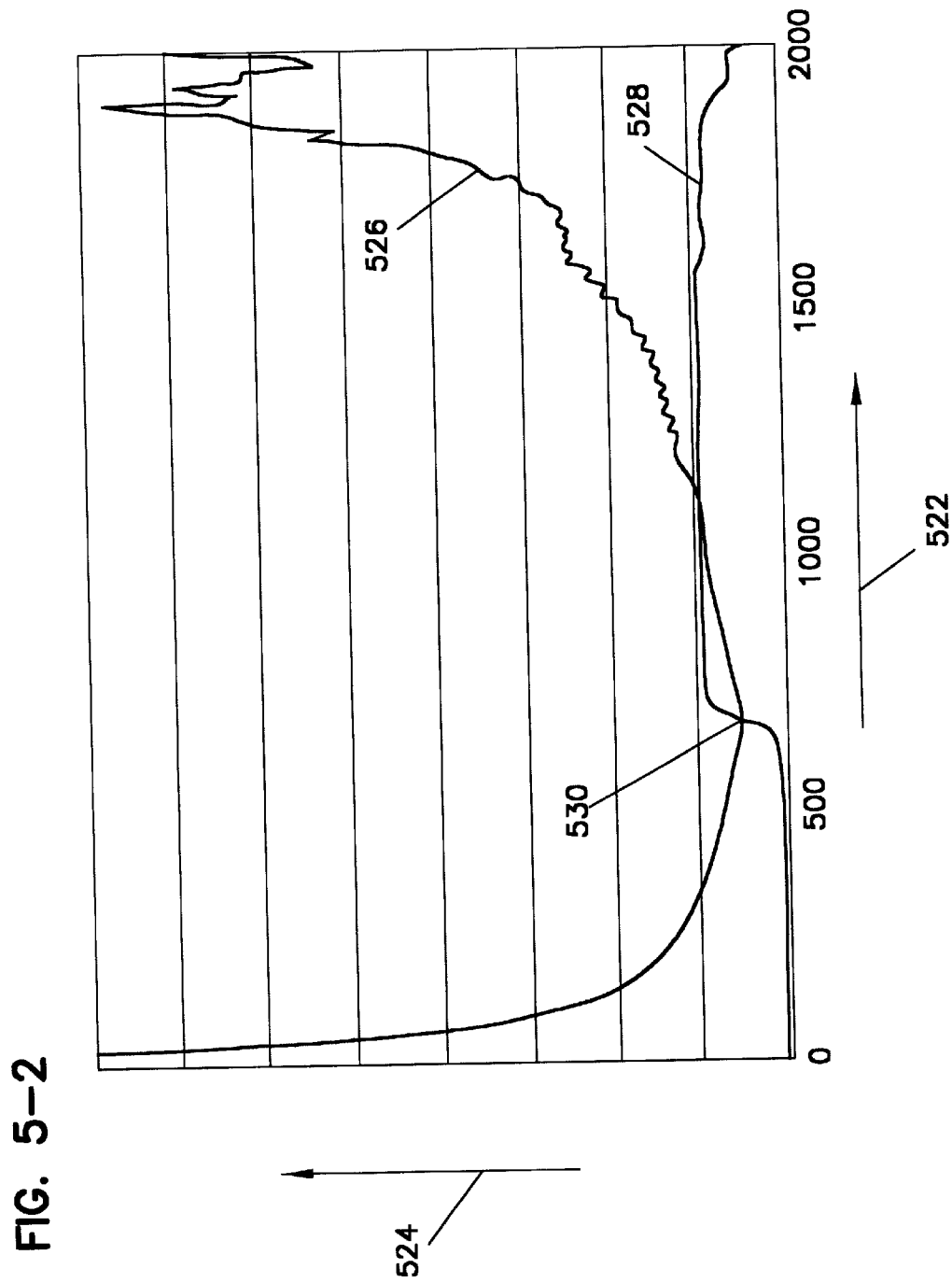

Referring now to FIG. 5-1, prior art write circuit 200 with impedance 501 measured looking through flex circuit interconnect path 142 with flex circuit connected to ground is shown. Impedance plots corresponding to impedance measurements performed at the position (impedance 501) illustrated in FIG. 5-1 are shown in FIG. 5-2. Magnitude impedance plot 526 shows the variation of the magnitude of impedance in ohms along axis 524 as a function of frequency in MHz along axis 522. For this circuit, series resonance occurs at series resonance point 530 at a frequency of 662 MHz with a corresponding common mode impedance of 2.7 ohms. Phase impedance plot 528 shows the variation of the phase of impedance in degrees along axis 524 as a function of frequency along axis 522. The phase angle at series resonance point 530 is 0 degrees indicating that the impedance at this point is purely resistive.

The above-mentioned problems with the prior art circuits demonstrated with the foregoing impedance measurement results can generally be solved by providing an appropriate return path for the common mode portion of the signal waveform. The provision of a return path for the common mode signal will eliminate the open circuit stub behavior of the common mode driver.

Figures 1, 6:
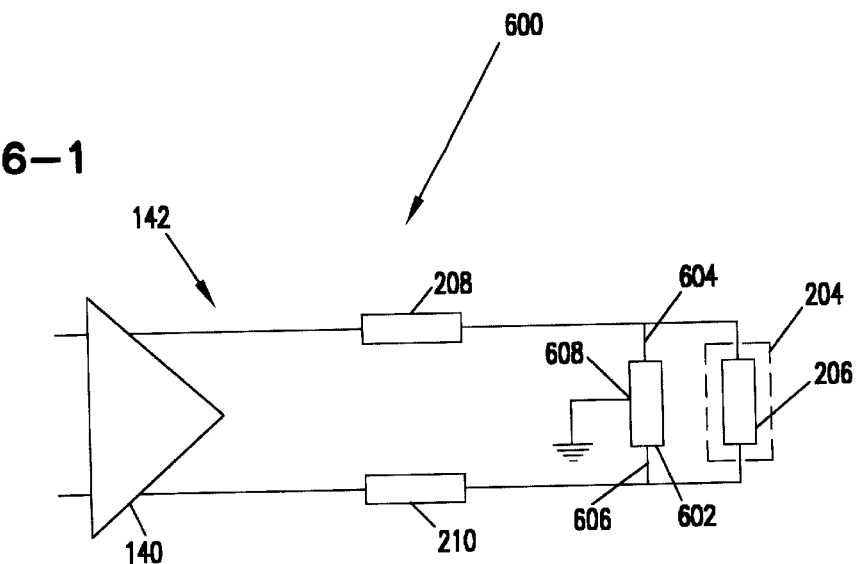
Figures 2, 6:
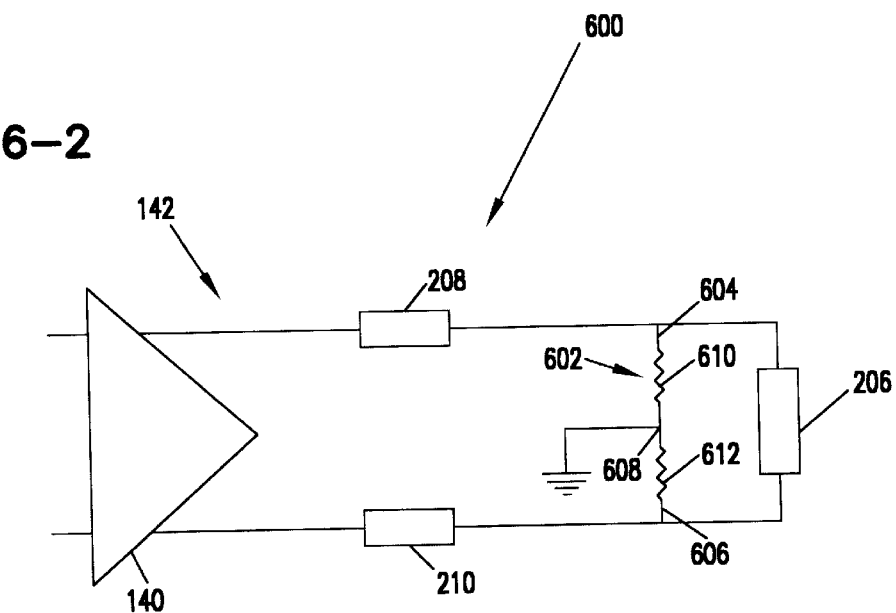
Figures 3, 6:
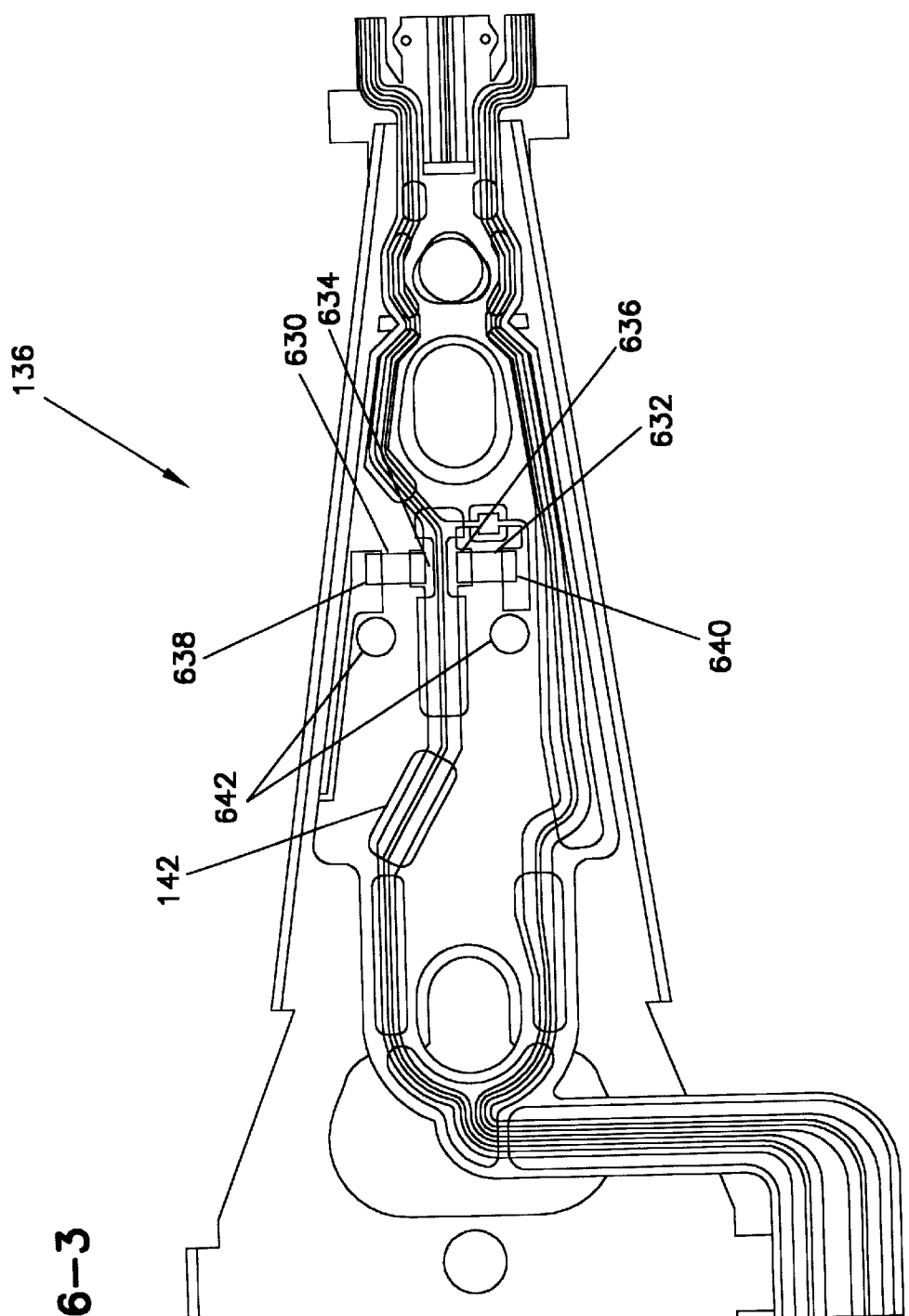

Referring now to FIG. 6-1, a schematic circuit diagram illustrating center tapped write circuit 600 in accordance with the present invention is shown. Center tapped write circuit 600 includes a write amplifier 140 that provides a differential input that drives head impedance 206 of head 204. Also included is interconnect path 142 with associated interconnect path impedances 208 and 210. Common mode termination network 602 which has a first node 604, a second node 606 and center tap 608 is included in center tapped write circuit 600. First node 604 of common mode termination network 602 is electrically coupled to a first end of head 204 and second node 606 of common mode termination network 602 is electrically coupled to a second end of head 204. Center tap 208 is connected to ground and thereby provides a return path for the common mode signal component produced by write amplifier 140.

Referring now to FIG. 6-2, center tapped write circuit 600 which includes a particular embodiment of common mode termination network 602 is shown. Common mode termination network 602 includes resistor 610 connected between first node 604 and center tap 608 and resistor 612 connected between second node 606 and center tap 608. Center tap 608 is connected to ground. Optimum values of resistors 610 and 612 are chosen to provide a return path for the common mode signal component without appreciably shunting current intended for the head.

FIG. 6-3 is a top view of a load beam portion of head-gimbal assembly 136 showing a flex circuit interconnect path 142 with a common mode termination network in accordance with an embodiment of the present invention. The common mode termination network includes resistor dies 630 and 632 electrically coupled to interconnect path 142 at their respective first ends 632 and 634. Second ends 638 and 640 of resistor dies 630 and 632 are connected to stainless spring ground (not shown) through holes 624 that provide a via path for the ground connection. The common mode termination networks of FIGS. 6-2 and 6-3 each have resistive components in different physical positions but are electrically identical.

Figures 1, 7:
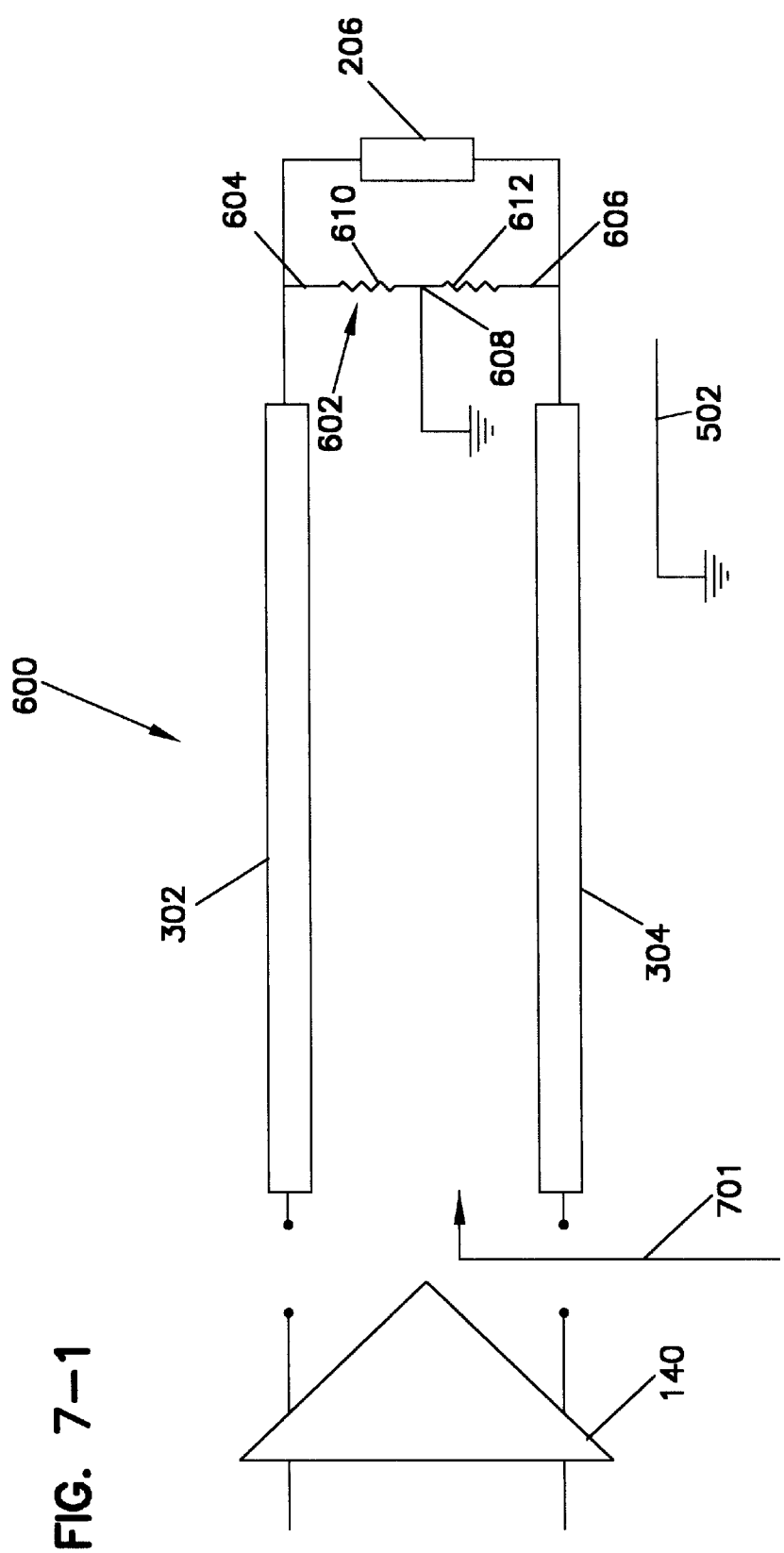
Figures 2, 7:
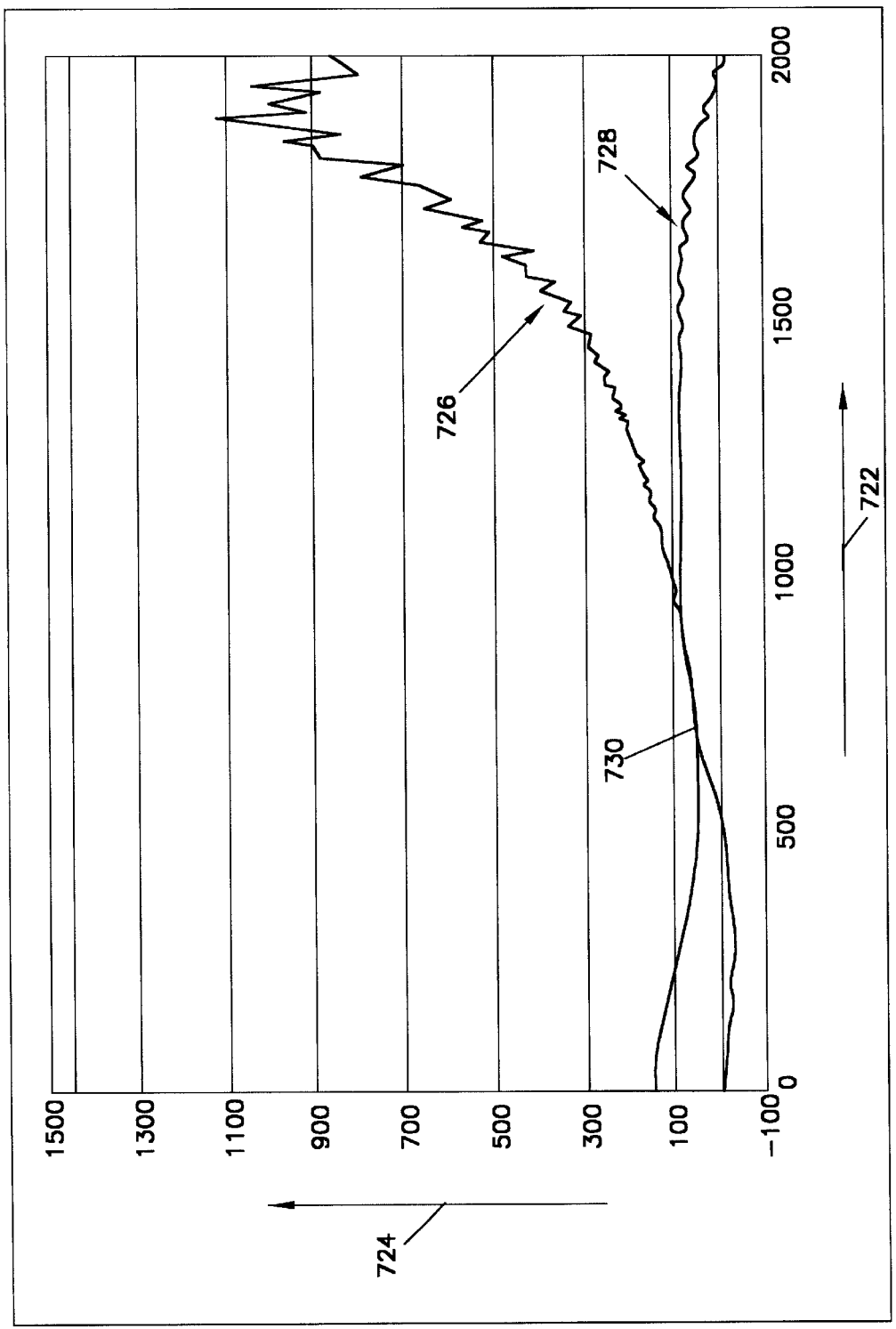

Referring now to FIG. 7-1, center tapped write circuit 600 with impedance 701 measured looking through the flex circuit interconnect path 142 with the flex circuit connected to ground is shown. In this embodiment resistors 610 and 612 are each 301 ohms. FIG. 7-2 shows impedance plots corresponding to impedance measurements performed at the position (impedance 701) illustrated in FIG. 7-1. Magnitude impedance plot 726 shows the variation of the magnitude of impedance in ohms along axis 724 as a function of frequency in MHz along axis 722. For this embodiment of center tapped write circuit 600, the lowest impedance of 40.7 ohms is seen at point 730 at a frequency of 662 MHz. Phase impedance plot 528 shows the variation of the phase of impedance in degrees along axis 724 as a function of frequency along axis 722. Resistors 610 and 612 of FIG. 7-1, which are 301 ohms each, absorb sufficient common mode energy and provide a return path from center tap 608 to ground without appreciably shunting current from the head.

The present invention can be summarized in reference to the FIGS., which illustrate disc drive 100 and embodiments of common mode termination network 602 included in center tapped write circuit 600. The disc drive storage system includes disc 202 having a disc surface and a write head 206 that writes on the disc surface. The write head has a first and second end. A signal source 114 provides a drive signal to write head 204. The drive signal includes a differential signal component and a common mode signal component. An electrical interconnect path 142 couples write head 204 and signal source 114. Electrical interconnect path 142 provides a return path for the differential signal component and an open circuit for the common mode signal component. A common mode termination network 602 that has a first node 604, a second node 606 and a center tap 608 is connected to write head 204. First node 604 is electrically operably coupled to the first end of write head 204 and second node 606 is electrically operably coupled to the second end of write head 204. Center tap 608 is connected to ground thereby providing a return path for the common mode signal component.

In some embodiments of the present invention, common mode termination network 602 includes a first resistor 610 connected between first node 604 and center tap 608 and a second resistor 612 connected between second node 606 and center tap 608.

In embodiments of the present invention, signal source 114 includes a write amplifier 140 electrically coupled by interconnect path 142 to write head 204. In some embodiments, interconnect path 142 includes a flexible electrical circuit that couples write amplifier 140 to transducer head 206.

Embodiments of the present invention include a method of operating a write head in a disc drive storage system by supplying a drive signal to write head 204. The method includes providing a return path for a common mode component of the drive signal.

In some embodiments, providing a return path includes forming a common mode termination network 602 to terminate the common mode component of the drive signal. In some embodiments, forming common mode termination network 602 includes linking a pair of resistors (610 and 612 of FIG. 6-1) in series with each other at a center tap 608, electrically coupling the linked series pair of resistors in parallel with write head 204 and connecting center tap 608 to ground.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the write circuit while maintaining substantially the same functionality without departing from the scope and spirit of the present invention. Although the invention has been described in terms of flex-on-suspension, the invention is applicable to any technique in which electrical conductors run along a disc suspension and couple to a head. In addition, although the preferred embodiment described herein is directed to a common mode termination method and apparatus for a write head in a disc drive system, it will be appreciated by those skilled in the art that the teachings of the present invention can be applied to any other electrical circuits that have no return paths for common mode signal components produced therein, without departing from the scope and spirit of the present invention.

What is claimed is:

1. A disc drive storage system comprising:
   a disc having a disc surface;
   a write head configured to write to the disc surface, the write head having a first end and a second end;
   a signal source configured to provide a drive signal to the write head, the drive signal including a differential signal component and a common mode signal component;
   an electrical interconnect path coupled between the write head and the signal source, the electrical interconnect path providing a return path for the differential signal component and an open circuit for the common mode signal component; and
   a common mode termination network having a first node, a second node and a center tap, wherein the first node is electrically operably coupled to the first end of the write head, the second node is electrically operably coupled to the second end of the write head and the center tap is connected to ground thereby providing a return path for the common mode signal component.

2. The disc drive storage system of claim 1, wherein the common mode termination network includes a network of resistors.

3. The disc drive storage system of claim 1, wherein the common mode termination network includes a first resistor connected between the first node and the center tap and a second resistor connected between the second node and the center tap.

4. The disc drive storage system of claim 3, wherein values of the first resistor and the second resistor are equal and between 200 ohms and 500 ohms respectively.

5. The disc drive storage system of claim 1, wherein the signal source includes a write amplifier circuit electrically coupled by the electronic interconnect path to the write head.

6. The disc drive storage system of claim 1, wherein the interconnect path includes a flex circuit coupling the signal source to the transducer head.

7. A method of operating a write head in a disc drive storage system, the method comprising:
   (a) supplying a drive signal to the write head; and
   (b) providing a return path for a common mode component of the drive signal by forming a common mode termination network, having a center tap connected to ground, to terminate the common mode component of the drive signal.

8. The method of claim 7, including forming the common mode termination network with a network of resistors.

9. The method of claim 7, including forming the common mode termination network by linking a pair of resistors in series with each other at a center tap, electrically coupling the linked series pair of resistors in parallel with the write head and connecting the center tap to ground.

10. The method of claim 7, including forming the common mode termination network by linking a pair or resistors each having a value between 200 ohms and 500 ohms in series with each other at a center tap, electrically coupling the linked series pair of resistors in parallel with the write head and connecting the center tap to ground.

11. A disc drive storage system implementing the method of claim 7.

12. A disc drive storage system for storing information on a surface of a disc, comprising:
   a signal source means for supplying a drive signal to a write head that writes information to the disc surface; and
   a common mode termination network means for providing a return path for a common mode component of the drive signal.

* * * * *